Aug. 28, 1934.   W. J. CAMERON   1,971,640
TRAP
Filed July 24, 1933
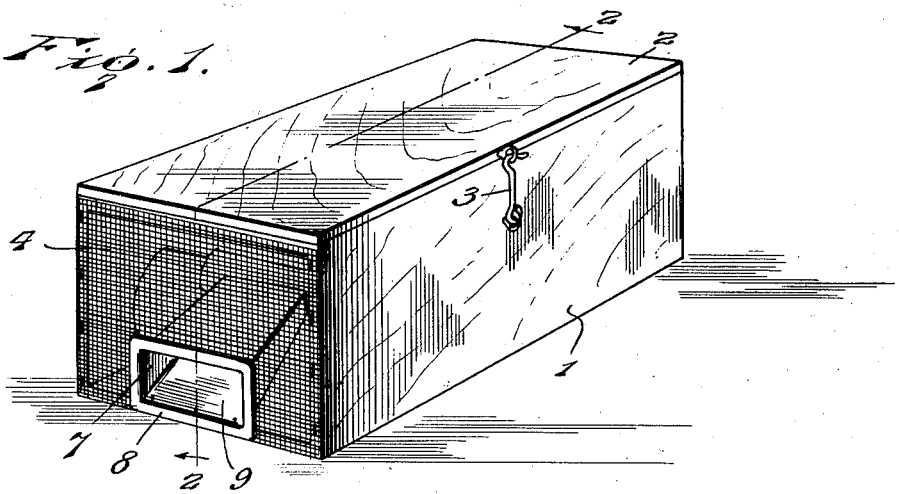
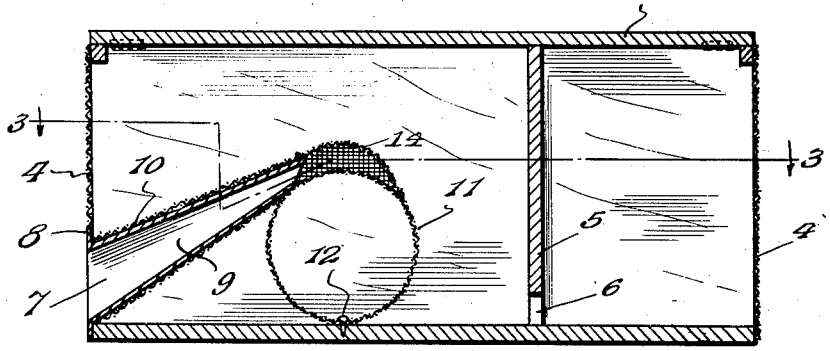
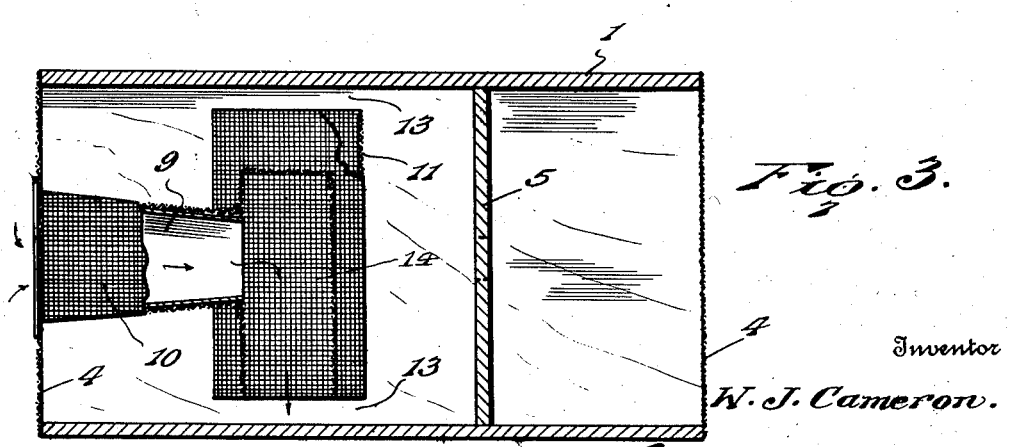
Inventor
W. J. Cameron.
By Lacey & Lacey
Attorneys Patented Aug. 28, 1934

1,971,640

UNITED STATES PATENT OFFICE 1,971,640

TRAP

William J. Cameron, New Smyrna, Fla.

Application July 24, 1933, Serial No. 682,005

3 Claims. (Cl. 43—121)

This invention relates to insect traps and has for its object to provide a simple and inexpensive trap which will operate efficiently to catch insects such as roaches and ants. The invention is illustrated in the accompanying drawing and will be hereinafter fully described, the novel features being particularly pointed out in the appended claims.

In the drawing,

Figure 1 is a perspective view of a trap embodying the present invention,

Figure 2 is a longitudinal section on the line 2—2 of Figure 1, and

Figure 3 is a horizontal section on the line 3—3 of Figure 2.

The body of the trap is a box-like structure 1 having its upper side normally closed by a swinging lid or cover 2 which is held in closed position by a latch 3 of any approved form. The ends of the box are open and covered by screens 4 which are preferably wire netting of a sufficiently fine mesh. Near one end of the box a partition 5 is secured across the same and this partition divides the box into two chambers, as shown clearly in Figures 2 and 3, the partition having an opening 6 in its lower edge which affords communication between the two chambers. The screen 4, over the end of the box more remote from the partition 5, has an opening 7 therethrough and around this opening is a flange 8 on the lower end of a tubular runway 9 which extends into the trap, as shown. Wire netting 10 is disposed over the entire exterior of this tubular runway 9 and the inner end of said runway rests upon a transversely disposed cylinder 11 of wire netting having open ends. This transverse cylinder is preferably secured to the bottom of the box by a nail or other fastener, as shown at 12, and the ends of the cylinder are spaced from the side walls of the box, as shown at 13, so that the insects entering the trap may readily pass from the cylinder into the compartment in which it is located.

The cylinder 12 serves as a support for the inner end of the entrance runway and also as a barrier to the insects which may seek a return to the runway. On top of the cylinder is a transverse passage defined by a strip 14 of wire netting arched over and secured at its side edges to the cylinder, one end of the strip being also secured to the cylinder so that one end of the passage is closed. The opposite end of the transverse passage is open and disposed at or close to the end of the cylinder while the inner end of the entrance runway opens through the front side portion of the strip 14 which forms, in effect, a tunnel or transverse runway.

The trap may be used with or without bait, as preferred, and as may be found most efficient under any given conditions. When bait is used it will be placed in the smaller compartment and the odor thereof may escape readily through the screened ends of the trap so as to attract the insects. The insects will enter the tubular runway 9 and pass up to the inner contracted end thereof, whence they will pass directly into the transverse runway or tunnel from which they cannot escape, except through the open end. From the open end of the tunnel or transverse runway, the insects will drop to the floor of the trap, or they may pass into the cylinder. The insects will be attracted by the odor of the bait, when it is used, and when bait is not used, the light will be strong enough at the ends of the cylinder to attract the insects so that they will pass from the cylinder and then find their way into the rear compartment where they will remain. When the insects are to be destroyed and the trap cleaned, the swinging cover 2 is raised thereby affording access to the interior of the trap. The entrance runway, as shown clearly in Figure 2, is tapered inwardly so that while a relatively large opening will be provided for the entrance of the insects, a relatively very small opening will be found at the inner end of the runway and the insects will be deterred from passing backward through the runway. The wire netting 10 may be utilized as a runway but I prefer to employ the tube 9 which will serve as a lining for the wire and may be of any inexpensive material, such as cardboard having a rough surface which will afford a sufficient footing for the insects.

The trap is very simple and may be produced at a trifling cost. It may be easily cleaned when cleaning is necessary or desirable and may be set in any place infested by the insects.

Having thus described the invention, I claim:

1. A trap comprising a box having screened ends, a partition within the box defining front and rear compartments and provided with an opening establishing communication between the two compartments, a transverse tunnel within the front compartment of the box having its ends spaced from the sides of the box, and a runway leading inwardly from the front end of the box into said tunnel.

2. A trap comprising a box having screened ends, a runway leading inwardly from one end of the box, a reticulated cylinder in the box supporting the inner end of the runway and forming a barrier against return movement of the insects, and a tunnel on said cylinder with which the inner end of the runway communicates.

3. A trap comprising a box having screened ends, a runway leading inwardly from one end of the box, a reticulated cylinder in the box supporting the inner end of the runway and forming a barrier against return movement of the insects, the ends of the cylinder being open and spaced from the sides of the box, and an arched strip of netting secured along its side edges to the cylinder and forming a tunnel therewith, one end of the tunnel being open and the inner end of the runway communicating with the tunnel.

WILLIAM J. CAMERON. [L. S.]